(No Model.)
L. B. CARRICABURU.
STEAM ACTUATED VALVE.
No. 303,705. Patented Aug. 19, 1884.
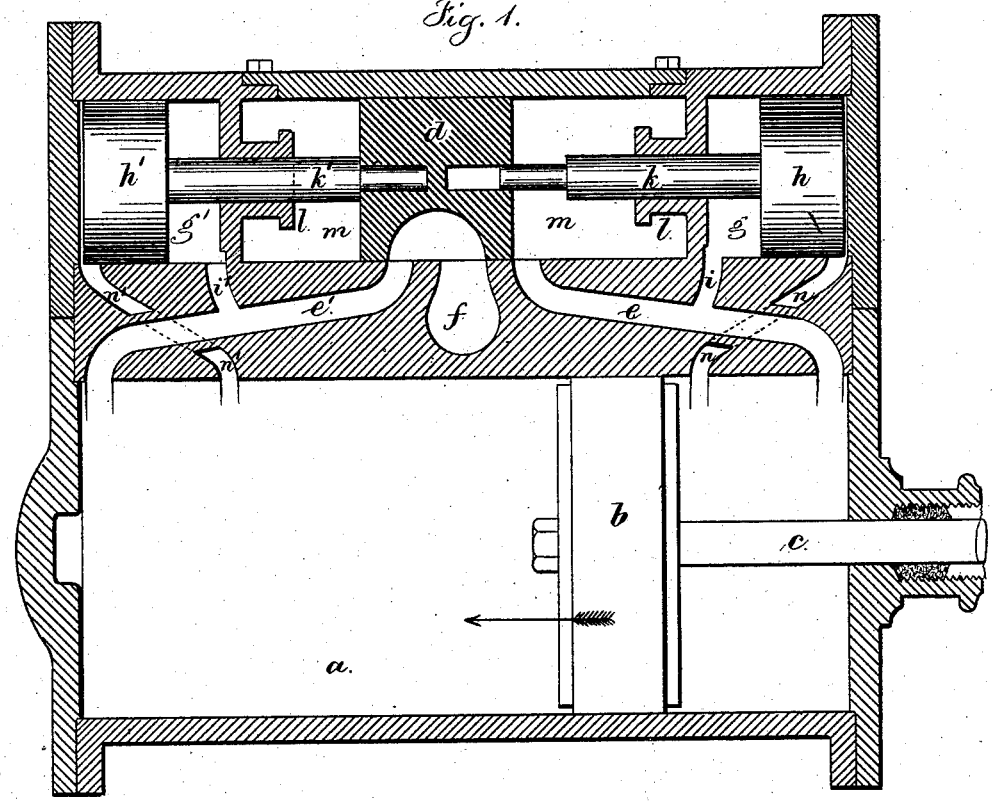
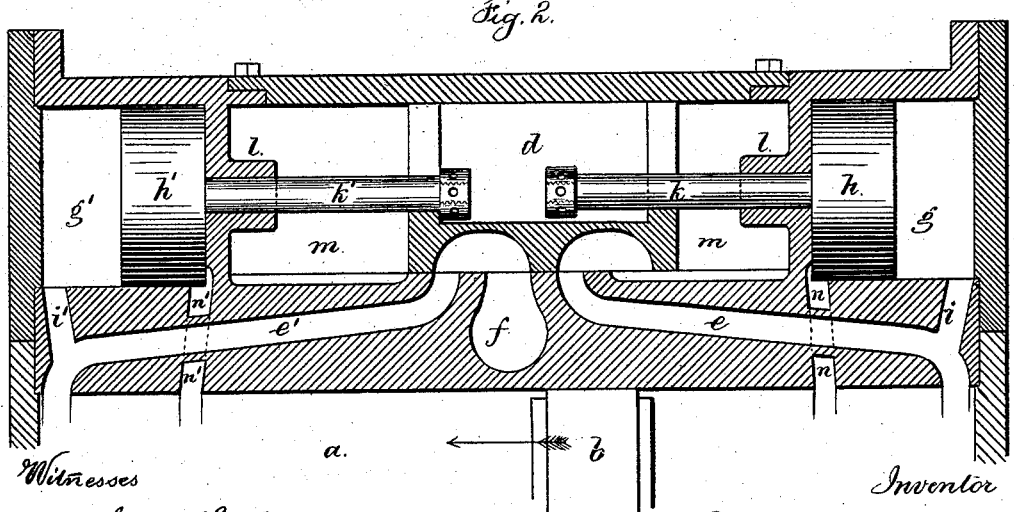
Witnesses
Chas. H. Smith
J. Haib
Inventor
Leon B. Carricaburu
per Lemuel W. Serrell
atty
N. PETERS. Photo-Lithographer. Washington, D. C.

UNITED STATES PATENT OFFICE.

LEON B. CARRICABURU, OF NEW YORK, N. Y.

STEAM-ACTUATED VALVE.

SPECIFICATION forming part of Letters Patent No. 303,705, dated August 19, 1884.

Application filed June 12, 1882. Renewed February 7, 1884. (No model.)

*To all whom it may concern:*

Be it known that I, LEON B. CARRICABURU, of the city and State of New York, have invented an Improvement in Direct-Acting Valves for Engines, of which the following is a specification.

This invention relates to that class of valves in which a piston actuated by steam gives motion directly to the valve. In my improvements the valve is between the rods of two pistons, one of which imparts motion to the valve in one direction and the other in the other direction, and each piston-rod, after it has given its motion to the valve, is drawn back out of the way, so that the movement by the other piston and rod may be as rapid as possible, and free from the frictional detention which would occur if one valve-piston had to move the other piston as well as moving the valve.

In the drawings, Figure 1 is a diagram section of the valve and actuating pistons and rods. Fig. 2 is a similar view in a slightly-modified form.

The steam-cylinder $a$, piston $b$, piston-rod $c$, valve $d$, steam-ports $e\ e'$, and exhaust-port $f$ are the same as in any ordinary engine. The cylinders $g\ g'$, with their pistons $h\ h'$ and piston-rods $k\ k'$, are used for moving the valve $d$. The piston-rods $k\ k'$ pass through packing-glands $l$, if desired. There is a steam-port, $n$, passing from the cylinder $a$ to the back end of the cylinder $g$, and this port $n$ is a sufficient distance from the cylinder-head to allow the piston $b$ to pass by and uncover the said port $n$ before the piston $h$ reaches the end of the stroke, so that steam from the cylinder $a$ rushes into the cylinder $g$ and moves the piston, piston-rod, and valve $d$ to the left, opening the port $e'$ to the exhaust or eduction $f$, and admitting live steam from the steam-chest $m$ through the port $e$, to move the piston $b$ to the left. The exhaust now acts in the cylinder $a$, and at the same time the steam in the port $e$ passes also into the cylinder $g$ by the port $i$ and moves the piston $h$ and rod $k$ back to the right, out of the way of the valve $d$, so that said valve $d$ may be moved to the right by the action of the piston $h'$ and rod $k'$, after the piston $b$ has passed the port $n'$ and steam has entered through the same into the cylinder $g'$. The parts connected with the cylinder $g'$, piston $h'$, and piston-rod $k'$ act in the same manner in moving the valve $d$ and admitting steam to the left-hand end of the cylinder $a$ as the corresponding parts at the right-hand end of the cylinder, as before described.

In the diagram section, Fig. 2, the same parts are shown as before described, except that the ends of the piston-rods $k\ k'$ are made with collars or projections within the valve, that act to pull the valve endwise instead of pushing it. In this case the ports will have to be changed, so that the port $n$ admits steam into the cylinder $g$, to move the piston $h$ to the right and draw the valve along to the right. The valve $b$, instead of being made with two bearings to form a D-valve, is made with three bearings to form the B-valve, both of which valves are well known. With this modification the port $i$ will be at the back end of the piston $h$, so that steam from $e$ will pass into the same and move the piston $h$ toward the valve $d$, in order that the piston-rod will not detain the valve when the time arrives for said valve to be moved the other way by the corresponding appliances at the left-hand end of the cylinder, as shown on the drawings. In these instances each valve-moving piston and rod has its own independent movements, and these result, primarily, from the engine-piston uncovering a port in the main cylinder. Each valve-moving piston actuates the valve in one direction only, and in the other direction it returns to a point of rest, leaving the valve in a position to be actuated by the other valve-moving piston; hence the steam, when acting to move the valve, has only to overcome the friction of the valve and the piston and rod that move the same.

It will be evident that the rods of the valve-moving pistons form guides to the valve, because the rods are within the opening in the valve, and steady the same, so that the valve cannot become displaced upon its seat, but it is always kept in line by the piston-rods.

I claim as my invention—

1. The combination, with the steam-valve $d$, of the pistons $h\ h'$, piston-rods $k\ k'$, cylinders $g\ g'$, and ports $e,\ i,\ n,\ e',\ i',$ and $n'$, substantially as set forth, whereby the pistons are moved in both directions by the action of the steam, and when moving one way give motion to the valve, and when moving the other way allow the valve to remain stationary, as specified.

2. The combination, with a steam-valve, of two small single and independent steam-pistons having their rods projecting inside of the steam-chest and acting alternately upon the valve, each piston and rod working independently of the other, and moving the valve and then returning to its normal position, substantially as specified.

Signed by me this 1st day of June, A. D. 1882.

L. B. CARRICABURU.

Witnesses:
GEO. T. PINCKNEY,
WILLIAM G. MOTT.